United States Patent
Castagna et al.

(10) Patent No.: US 6,442,245 B1
(45) Date of Patent: Aug. 27, 2002

(54) SYSTEM AND METHOD FOR PROVIDING VOICE MESSAGING SERVICES UTILIZING A NETWORK CONNECTION

(75) Inventors: William D. Castagna, Ojai; Shawn W. Smith, Ventura; Jan Vanderford, Santa Barbara, all of CA (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/243,213

(22) Filed: Feb. 2, 1999

Related U.S. Application Data

(60) Provisional application No. 60/073,442, filed on Feb. 2, 1998.

(51) Int. Cl.[7] .................................................. H04M 1/64
(52) U.S. Cl. .............................. 379/88.12; 379/211.01
(58) Field of Search ..................... 379/67.1, 70, 88.12,
379/88.17, 88.22, 90.01, 93.17, 93.23, 210,
211, 212, 213, 214, 215, 210.01, 210.02,
211.01, 211.02, 212.01, 214.01, 215.01,
372, 373.01

(56) References Cited

U.S. PATENT DOCUMENTS

| | | | |
|---|---|---|---|
| 5,263,080 A | 11/1993 | Jones et al. .................... 379/88 |
| 5,327,486 A | 7/1994 | Wolff et al. .................... 379/96 |
| 5,349,638 A | 9/1994 | Pitroda et al. ............... 379/142 |
| 5,388,151 A | 2/1995 | Khalid et al. .................. 379/67 |
| 5,418,835 A | 5/1995 | Frohman et al. ............... 379/57 |
| 5,418,845 A | 5/1995 | Reeder ......................... 379/213 |
| 5,471,519 A | * 11/1995 | Howe et al. ................... 379/67 |
| 5,548,636 A | 8/1996 | Bannister et al. ........... 379/201 |
| 5,555,553 A | * 9/1996 | Jonsson ....................... 379/214 |
| 5,588,045 A | 12/1996 | Locke .......................... 379/67 |
| 5,590,178 A | 12/1996 | Murakami et al. ............. 379/96 |
| 5,651,054 A | * 7/1997 | Dunn et al. .................... 379/67 |
| 5,930,338 A | * 7/1999 | McKendry et al. ...... 379/88.25 |
| 5,956,389 A | * 9/1999 | Jung ........................ 379/88.12 |
| 6,031,896 A | * 2/2000 | Gardell et al. ........... 379/88.17 |
| 6,350,066 B1 | * 2/2002 | Bobo, II ................ 395/200.36 |

OTHER PUBLICATIONS

Fujitsu, Real Applications of Computer Telephony Integration, Circle reader service card No. 83.

MacPherson, Why Call Centers Won't Escape the World Wide Web, Business Communications Review/Jun. 1996.

* cited by examiner

Primary Examiner—Scott L. Weaver
(74) Attorney, Agent, or Firm—Michael B. Atlass; Lisa A. Rode; Mark T. Starr

(57) ABSTRACT

When an incoming call is received, a signal is sent to a computer that monitors the telephone line. If the telephone is not answered, the messaging system sends a signal and streaming audio signals to the computer. The signals are output over speakers connected to the computer.

8 Claims, 1 Drawing Sheet

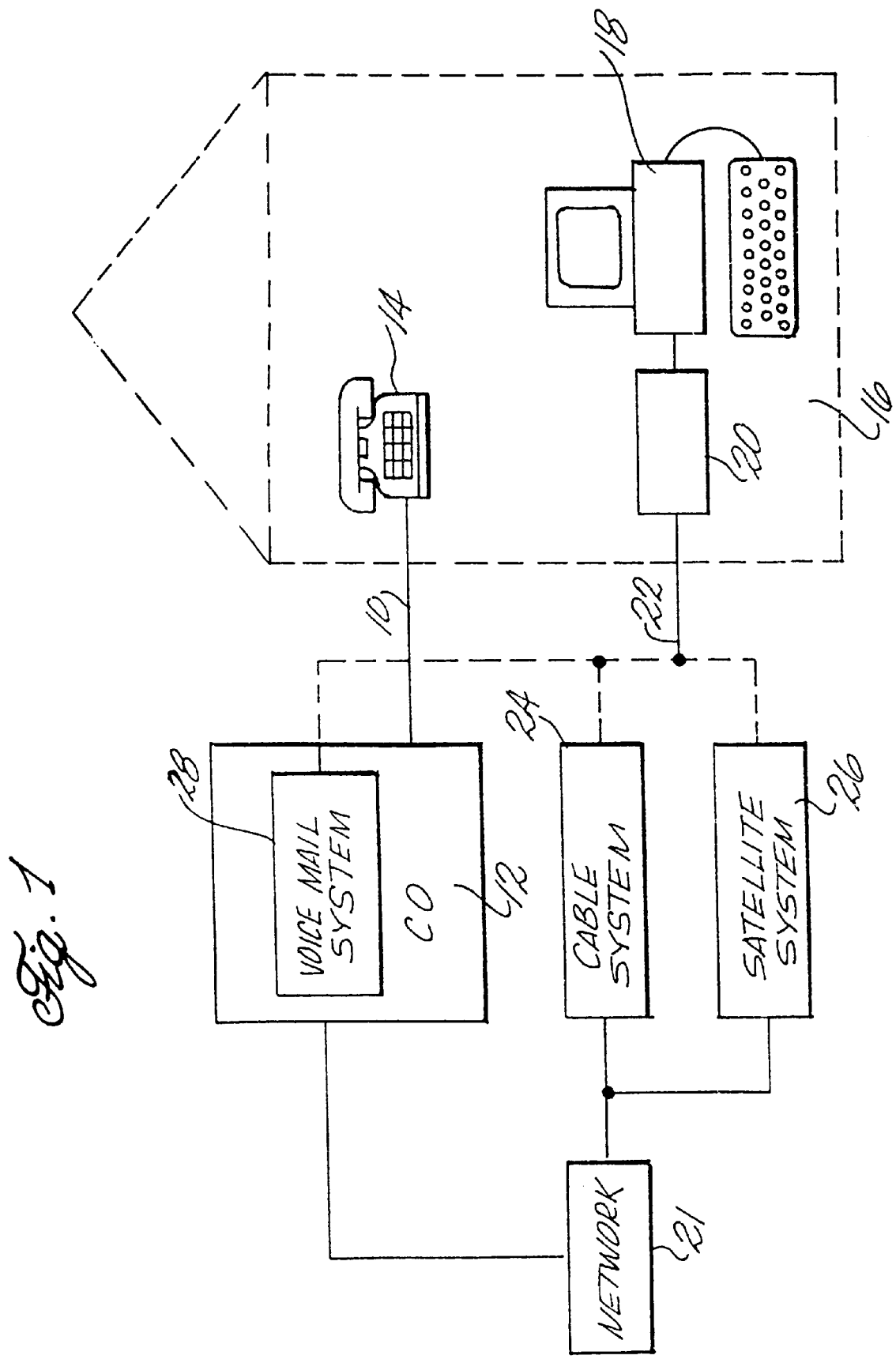

SYSTEM AND METHOD FOR PROVIDING VOICE MESSAGING SERVICES UTILIZING A NETWORK CONNECTION

CROSS-REFERENCE TO RELATED APPLICATION

This application claims priority of U.S. provisional Application No. 60/073,442 filed Feb. 2, 1998, the disclosure of which is incorporated fully herein by reference.

BACKGROUND OF THE INVENTION

There are two predominant types of systems used by home telephone or small office locations to answer telephone calls and electronically store telephone messages. The first is the common answering machine; the second is to subscribe to voice mail service provided by a central provider, such as the local telephone company. Each of these system have advantages and disadvantages compared with the other system. Central messaging systems are more reliable than home answering machines. The central systems use digital storage methods and often use redundant systems so that if a hard disk or other hardware system malfunctions, the system still operates correctly, without loss of data. If the subscriber's home loses power, the central messaging system keeps working while the home answering machine stops working. Central messaging systems can also handle more than one incoming call at a time for the same home telephone number. Home answering machines, on the other hand, only handle one call at a time and if a second call comes in, the second call gets a busy signal if the home does not have call waiting. If the home has call waiting, a possibly worse result may occur; the caller hears endless ringing, as the home answering machine is not able to answer call waiting calls, and the caller may assume that the phone number does not have answering machine and thus may not call back shortly to leave a message, with the result that the home user may miss an important message. Last, central messaging systems are often much easier to access by the subscriber when the subscriber is away from home. While many home answering machines have remote message retrieval features, the user interfaces are often clumsy and ineffective. Central messaging systems also sometimes have toll free numbers for out of town subscribers to use to retrieve messages.

Home answering machines, on the other hand, have certain advantages over existing central messaging systems. One advantage of home answering machines is that when the subscriber walks into the home and there are messages waiting, a red light, illuminated number or other visual indication is given on the home answering machine to indicate that the machine has received new messages. On most central messaging systems, the subscriber must actively take some action, such as pick up a telephone receiver to see if there is stutter dial tone instead of the normal dial tone, in order to find out if there are new messages waiting. The other main advantage of home answering machines is that they can be used to screen incoming telephone calls. Many home answering machine users do not answer telephone calls even when they are home. Rather, they let the answering machine answer the telephone call, play the greeting message, let the caller begin to leave a message and identify the caller before they decide whether to answer the telephone call or not. With a central messaging system, once an unanswered call is answered by the messaging system, the subscriber cannot listen to the message being left or decide to answer the call.

It is desired to have a system that has the advantages of each of these systems with few or none of the disadvantages.

BRIEF DESCRIPTION OF THE DRAWINGS

FIG. 1 is a block diagram of a preferred embodiment according to the invention.

DETAILED DESCRIPTION OF THE INVENTION

FIG. 1 shows a system according to an embodiment of the invention. The system includes a traditional telephone line 10 connecting the telephone central office 12 to the telephone 14 of a home or small office 16 (collectively referred to herein as a home). The home also includes a computer 18. The computer is connected to an interface circuit 20 for interfacing the computer with a computer network 21. The computer network is preferably the Internet, but alternatively can be any other computer network that both the telephone central office and the home computer can connect to simultaneously. The interface circuit 20, likewise, can alternatively be any interface circuit necessary to connect to the network, including, but not limited to a modem connected to a telephone line 22, a cable modem connected to a cable television system 24 or a satellite receiver connected to a satellite system 26, such as DirecPC (DirecPC is a trademark of Hughes Electronics).

Preferably, the connection between the computer 18 and the network is a constant connection, or at least a connection on demand which can be connected in a matter of seconds.

The system of FIG. 1 also includes a messaging system 28 in the telephone central office. The messaging system 28 is in most respects a typical messaging system such as a VoiceServer® 2110 system (VoiceServer is a registered trademark of PulsePoint Communications).

The messaging system 28 is modified so that when an incoming call is received for a phone number of a subscriber, whether it be the subscriber's home number, cellular number, business number, some other number or any combination of these, a realtime signal is sent over the network 21 to the computer 18 that indicates that an incoming call is arriving. Thus, at the same time the central office is sending a ring tone to, for example, the subscriber's home phone, a signal is sent to the computer 18 that may include, among other things, Caller ID or ANI information for the call that is being presented on the home phone line. At all times, the computer is running a program in the background that monitors the network for this type of signal. When such a signal is received, a window is displayed on the computer that indicates the originating phone number of the incoming call (i.e., the computer operates as a Caller ID box). In an alternative embodiment, the computer includes an address book database that identifies any phone numbers in the database by caller name or location rather than phone number.

If the home's phone 14 is not answered, the messaging system 28 begins the standard process for receiving a message: playing a greeting and recording a message after the greeting is completed. In the preferred embodiment, though, the messaging system sends an alert signal over the network 21 to the computer 18 as soon as the messaging system determines that it will start the process for receiving a message. Immediately after sending the alert signal, the messaging system begins sending streaming audio signals, using conventional technology, such as RealAudio (RealAudio is a trademark of RealNetworks), containing the greeting and the message being recorded. The computer, on the other hand, receives the alert signal and prepares for the coming streaming audio signals by loading the appropriate program or programs to process the streaming audio signals and output the encoded audio over speakers (not shown) connected to the computer. In an alternative embodiment, the greeting is not sent to the computer over the network because the computer may not be able to load the streaming audio processor program in time to receive the greeting in near real time and thus introduce an unacceptable delay between the message being spoken and the presentation of the message being left. In another alternative embodiment, the streaming audio processor program remains loaded on the computer 18 at all times so that the computer is ready to receive streaming audio data at any time. Alternatively, a combination of the two previously described alternatives is employed.

If the home subscriber decides, after listening to a portion of the message being received by the messaging system and being played over the speakers connected to the computer 18, that they wish to answer the call after all, they simply pick up their phone 14. A signal is then routed from the central office 12 to the messaging system 28 indicating that the phone 14 has been taken off hook. When this signal is received by the messaging system, the messaging system stops recording the message and transfers the call back to the central office which in turn reconnects the call to the phone 14. In this way, the system retains the advantages of a central messaging system, but adds the desirable call screening feature available from home answering machines.

In an alternative embodiment, in addition to being able to pick up the phone 14 to be connected to a call that they are screening through their computer, a button is provided in a window on the screen of the subscriber's computer. If the subscriber presses this button, a signal is then routed back over the network 21 to the messaging system 28 indicating that the subscriber wishes to intercept the call with the subscriber's computer. When this signal is received by the messaging system, the messaging system stops recording the message and transfers the call to any of the available network telephony protocols and software, such as Net-Phone (NetPhone is a trademark of NetPhone, Inc.) allowing the subscriber to use their computer's microphone and speakers to take the call.

It is noted at this point that while the call screening feature of the preferred embodiments works best if the subscriber's computer is left on (it usually takes computer's too long to boot up for a subscriber to be able to hear their phone ringing, decide that they want to screen the call, turn on their computer, have it boot up and connect to the network in time to hear the message being left before the caller hangs up), all of the other features of the voice messaging system, including the basic task of taking messages for calls not answered by the subscriber still operate if the subscriber's computer is turned off. This is in contrast to PC-based, software answering machines that rely on the computer's fax/modem to answer calls made to the home phone line after a predetermined number of rings. In such a PC-based answering system, the subscriber's PC must remain on 24 hours a day, seven days a week. In this sense, the PC-based answering machines have many of the same shortcomings of traditional home answering machines.

Another aspect of the system is the ability to provide the home subscriber with a message waiting indicator. The messaging system 28, whenever it has unaccessed messages for a particular subscriber, periodically sends a signal over the network to the computer 18 indicating this. Likewise, when the messaging system 28 has no unplayed messages for a particular subscriber, it periodically sends a signal over the network to the computer indicating this state. These signals are sent periodically, as opposed to once, to guard against the situation where a signal gets lost or is otherwise not delivered or not received by computer 18. Computer 18, meanwhile, includes a window, or, in an operating system as Windows 95, an icon in the system tray portion of the task bar, that indicates whether there are unplayed messages waiting at the messaging system. If a single computer is used to monitor more than one phone line, separate message waiting indicators are provided for each phone line. In an alternative embodiment, a device is placed next to the phone 14 that includes a message waiting indicator that is connected to the computer 18 by such convention manners as wire, infrared, RF and AC line modulation.

What is claimed is:

1. A method of monitoring a message left by a calling party and optionally communicating via a communications network with said calling party, the method comprising:

receiving an incoming call via a telecommunications network at a messaging device;

transmitting a signal from said messaging device to a computing device, via a telecommunications network, the signal indicating that said incoming call has been received;

playing at said messaging device a first message;

receiving at said messaging device a second message to be recorded; and transmitting from said messaging device to said computing device, streaming audio signals via a communications network.

2. The method of claim 1, wherein said streaming audio signals comprise the first message.

3. The method of claim 1, wherein said streaming audio signals comprise the second message.

4. The method of claim 1, wherein said streaming audio signals comprise a conversation.

5. The method of claim 1, further comprising:

receiving a signal at said messaging device from said computing device, indicating that said computing device will process the call, ceasing recordation of said second message at the messaging device; and transferring said incoming call to a network telephony network for enabling the taking of said incoming call at the computing device using the computing device's microphone and speakers.

6. The method of claim 1, further comprising:

receiving a signal from a telephone via a central office, indicating that said telephone has been taken off hook;

ceasing to record said second message at said messaging device; and transferring said incoming call to said central office for reconnection of said incoming call to said telephone.

7. The method of claim 1, wherein said incoming call may be to one of a list comprising:

a home telephone directory number of a subscriber, a business directory number of the subscriber, a cellular phone telephone number of the subscriber and any combination thereof.

8. The method of claim 1, further comprising transmitting a signal causing said computing device to load computer-executable instructions for processing said streaming audio signals.

* * * * *